INVENTOR
JOSEPH MARION WIMMER, Deceased
By JOHN N. WIMMER, ADMINISTRATOR.
By Weatherford and Weatherford
Attorneys Patented Apr. 21, 1953

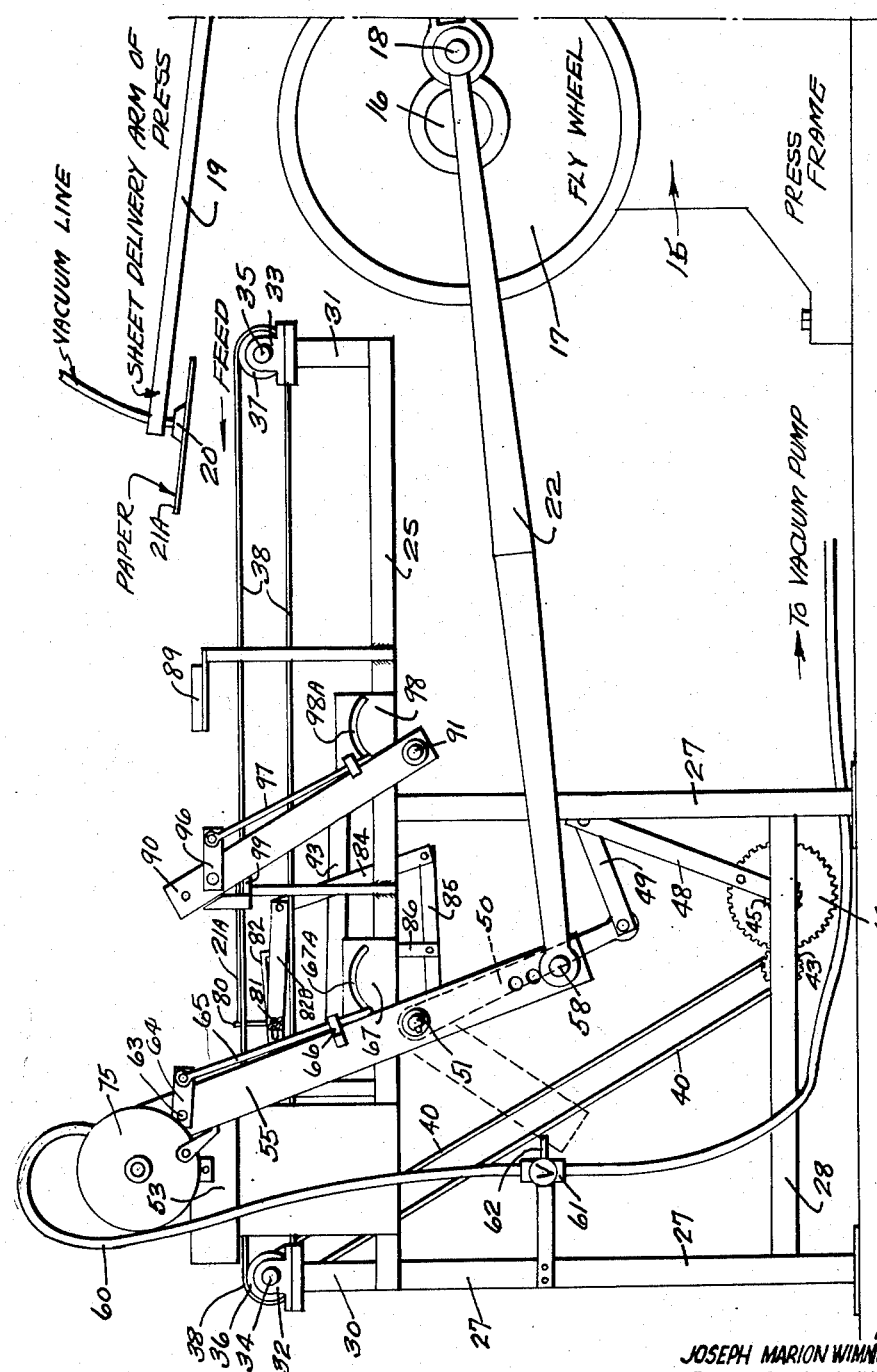

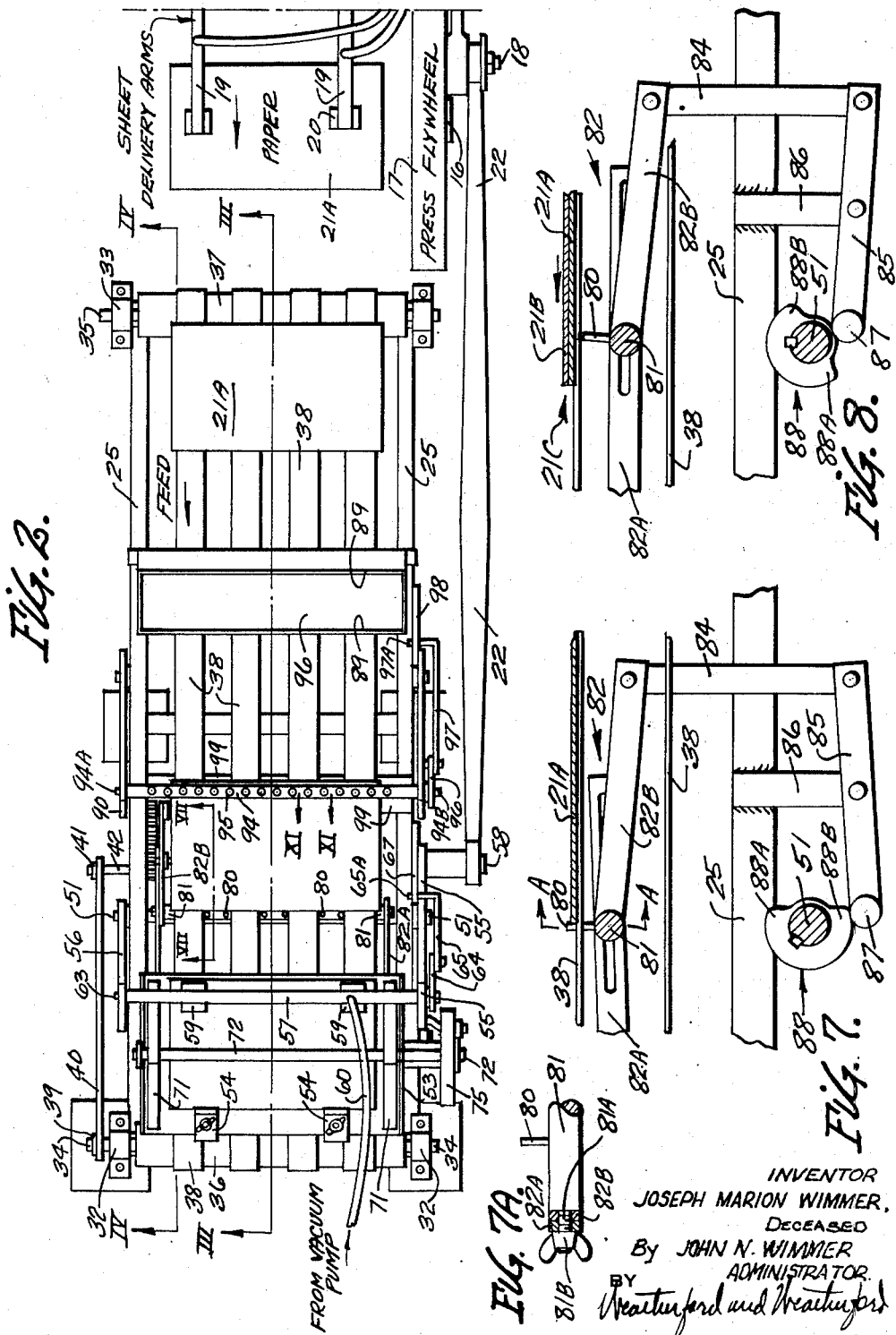

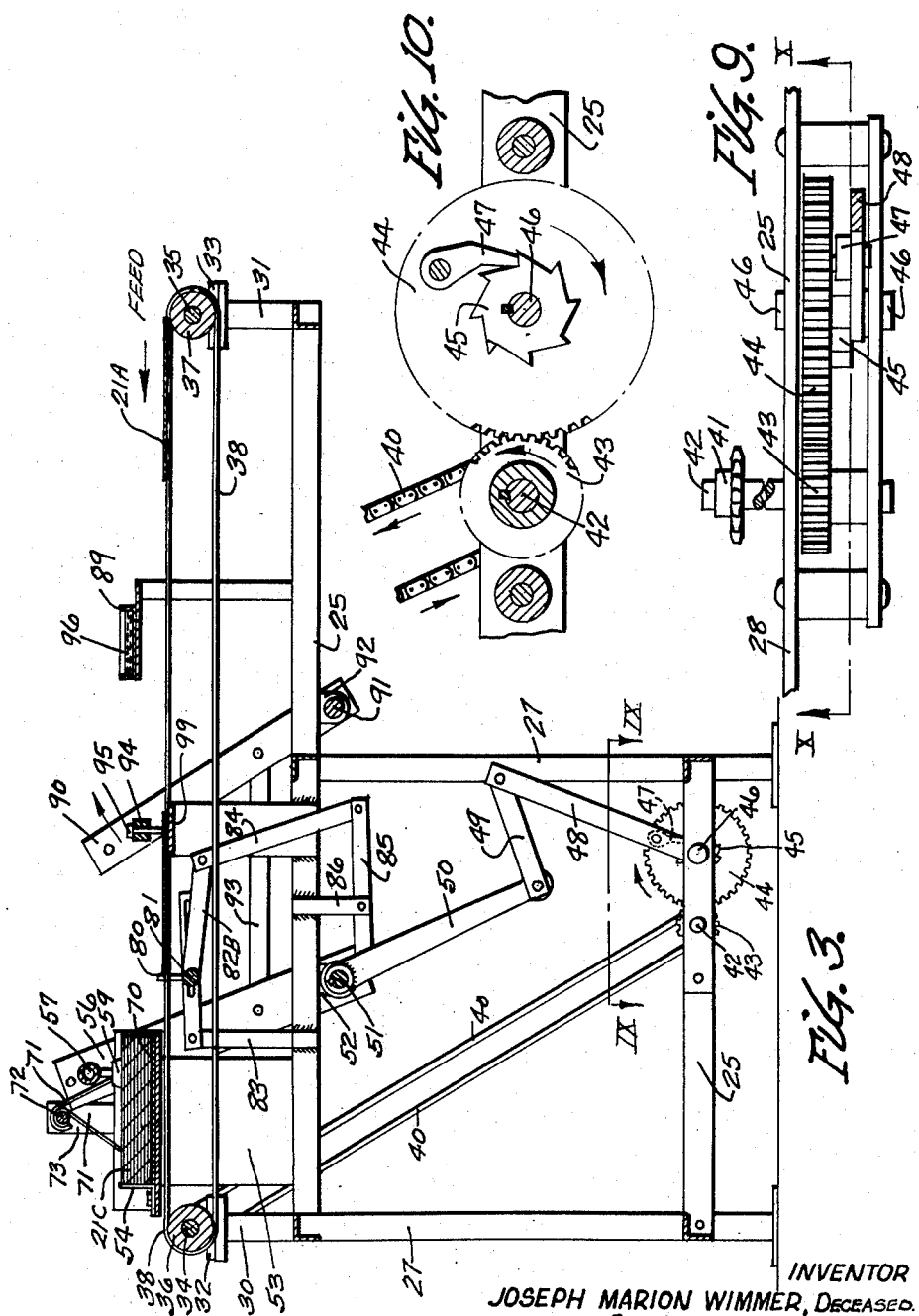

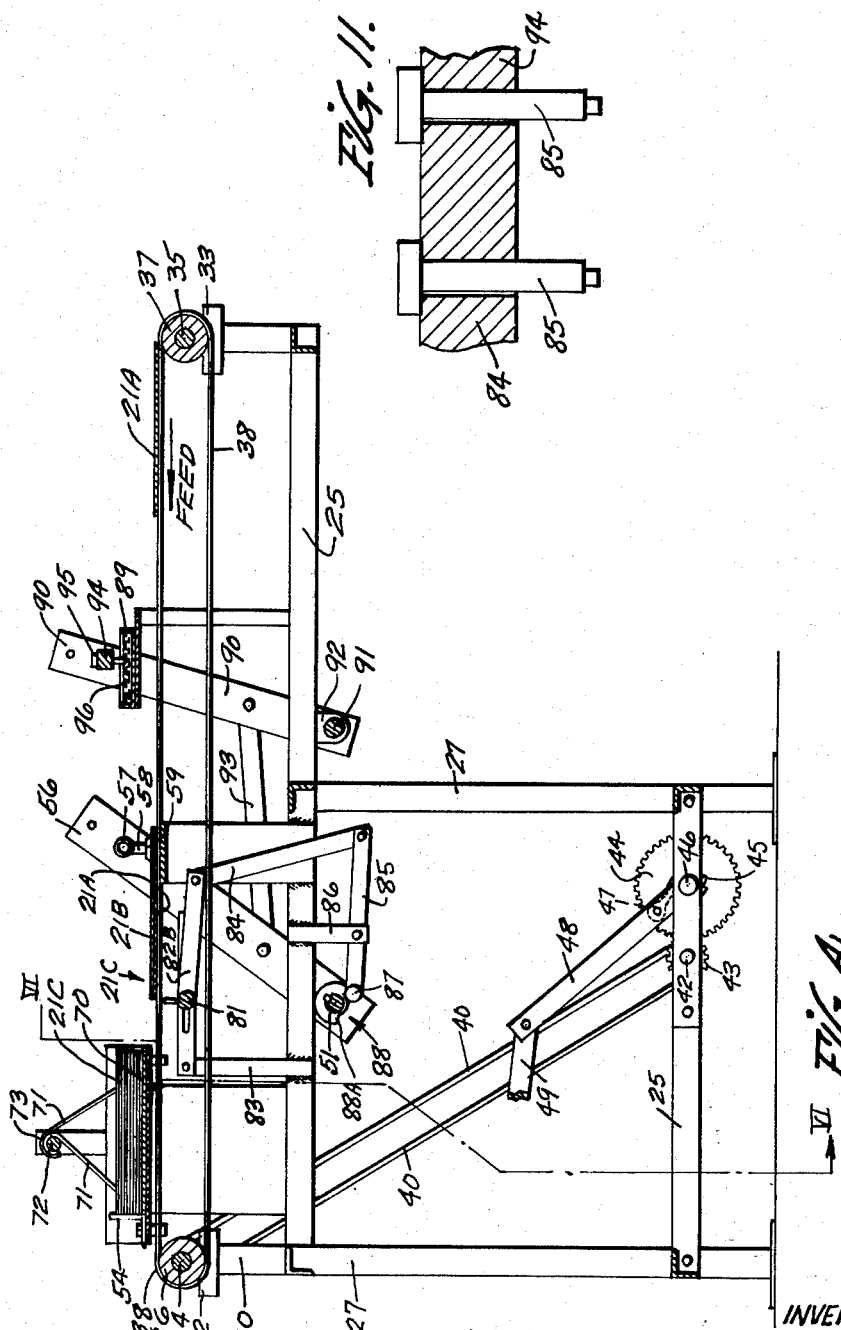

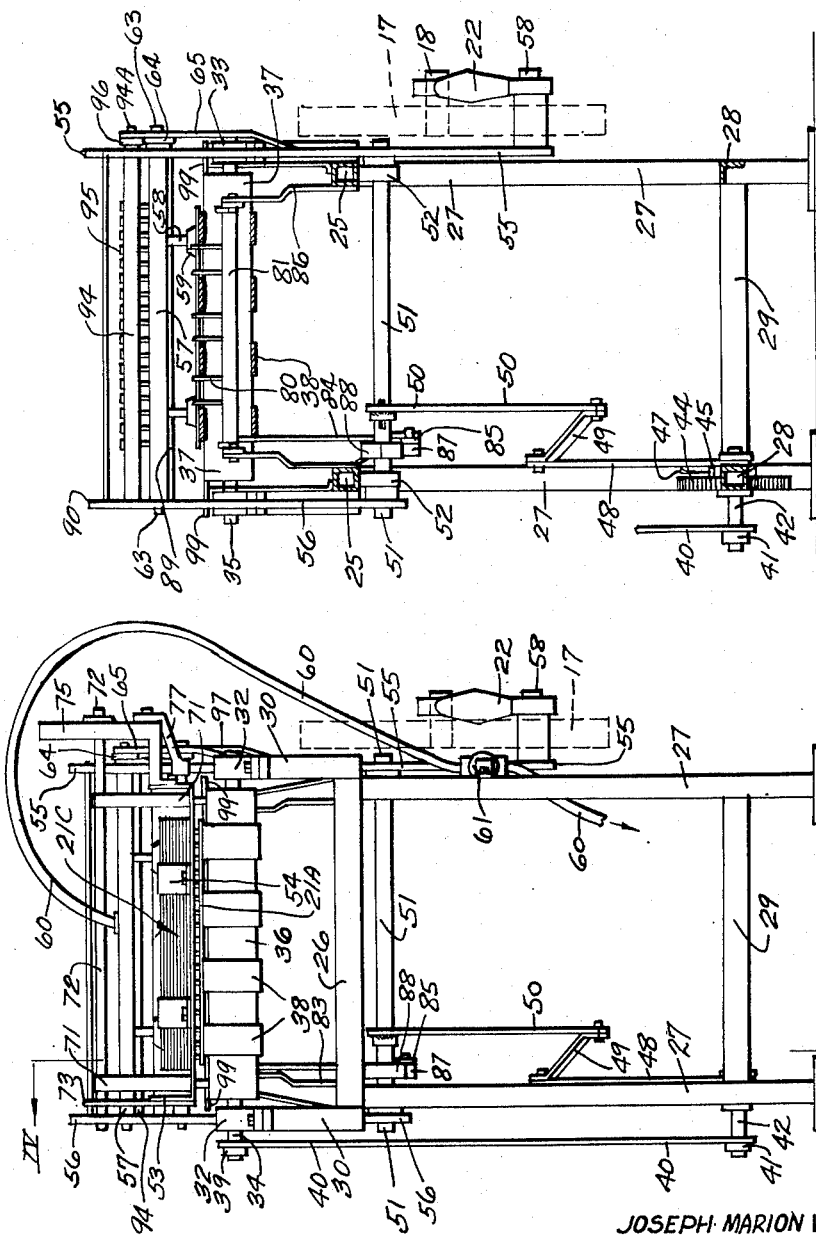

2,635,871

UNITED STATES PATENT OFFICE 2,635,871

SHEET ASSEMBLING AND PASTING MACHINE

Joseph Marion Wimmer, deceased, late of Memphis, Tenn., by John N. Wimmer, administrator, Memphis, Tenn.

Application October 19, 1951, Serial No. 252,046

13 Claims. (Cl. 270—59)

This invention relates to machines for assembling and securing together sheets of paper or like material in pairs and has particular reference to a machine for receiving, as from a printing press, successive sheets, hereinafter designated lower sheets, or paper, transferring each said lower sheet as received into adjacency to a stack of sheets, hereinafter designated upper sheets, stopping each said lower sheet as it reaches said stack adjacency, applying adhesive adjacent one edge of said lower sheet, removing from said stack a said upper sheet and depositing it in end and side alinement on and securing it to said adhesived lower sheet, while receiving from said press a successive lower sheet and subsequently transferring said adhesively secured pair of sheets to delivery and concurrently placing said successively received lower sheet in adjacency to said stack and repeating said operations.

The objects of the present invention are:

To provide means for receiving sheets of paper as they are successively delivered as from a printing press, shifting each said sheet to an assembly position, applying adhesive to said sheet, placing over said adhesived sheet a second sheet from an independent source, adhesively uniting said sheets and discharging said united sheets.

To provide means for receiving sheets, applying adhesive, accomplishing assembling, securing and discharging operations and for timing said operations.

To provide means for receiving sheets and for transferring and delivering said sheets in timed relation to their delivery to said receiving means.

To provide means for interrupting movement of each delivered sheet during said transfer.

To provide means, timed with and during interruption of said sheet movement, for applying adhesive to said sheet.

To provide means, timed with and during interruption of said sheet movement and subsequent to application of said adhesive, for placing a second sheet on and uniting said second sheet to said adhesived sheet.

To provide means for subsequently discharging said united sheets.

The means by which the foregoing and other objects of the invention are accomplished and the manner of their accomplishment will readily be understood from the following specification upon reference to the accompanying drawings, in which:

Fig. 1 is a side elevational view of the machine, together with fragmentary portions of a platen type printing press.

Fig. 2 is a corresponding plan view of the machine, and fragmentary portions of the press and interconnecting coordinating linkage.

Fig. 3 is a longitudinal sectional elevational view of the machine taken on the line III—III of Fig. 2, showing the parts in the same positions as in Fig. 1.

Fig. 4 is a similar sectional elevational view taken on the line IV—IV of Fig. 5, showing the machine at substantially the mid-point of the operating cycle.

Fig. 5 is an end elevational view.

Fig. 6 is a cross sectional elevational view taken on the line VI—VI of Fig. 4.

Figs. 7 and 8 are related enlarged fragmentary side elevational views showing a stop-pin and control cam and linkage in stop and release positions of the pins.

Fig. 7A is a section on the line A—A of Fig. 7 showing detail of the stop pin bar connection to the shift arm.

Fig. 9 is an enlarged fragmentary plan view taken on the line IX—IX of Fig. 3.

Fig. 10 a related fragmentary elevational view taken on the line X—X of Fig. 9 showing the same parts.

Fig. 11 is a much enlarged fragmentary sectional elevational view taken as on the line XI—XI of Fig. 2 of the dip pin bar and pins.

Fig. 12 is a side elevational view of a modification, substituting a coordinated sheet feed built into the machine, for the press sheet feed of Fig. 6.

Figure 12:
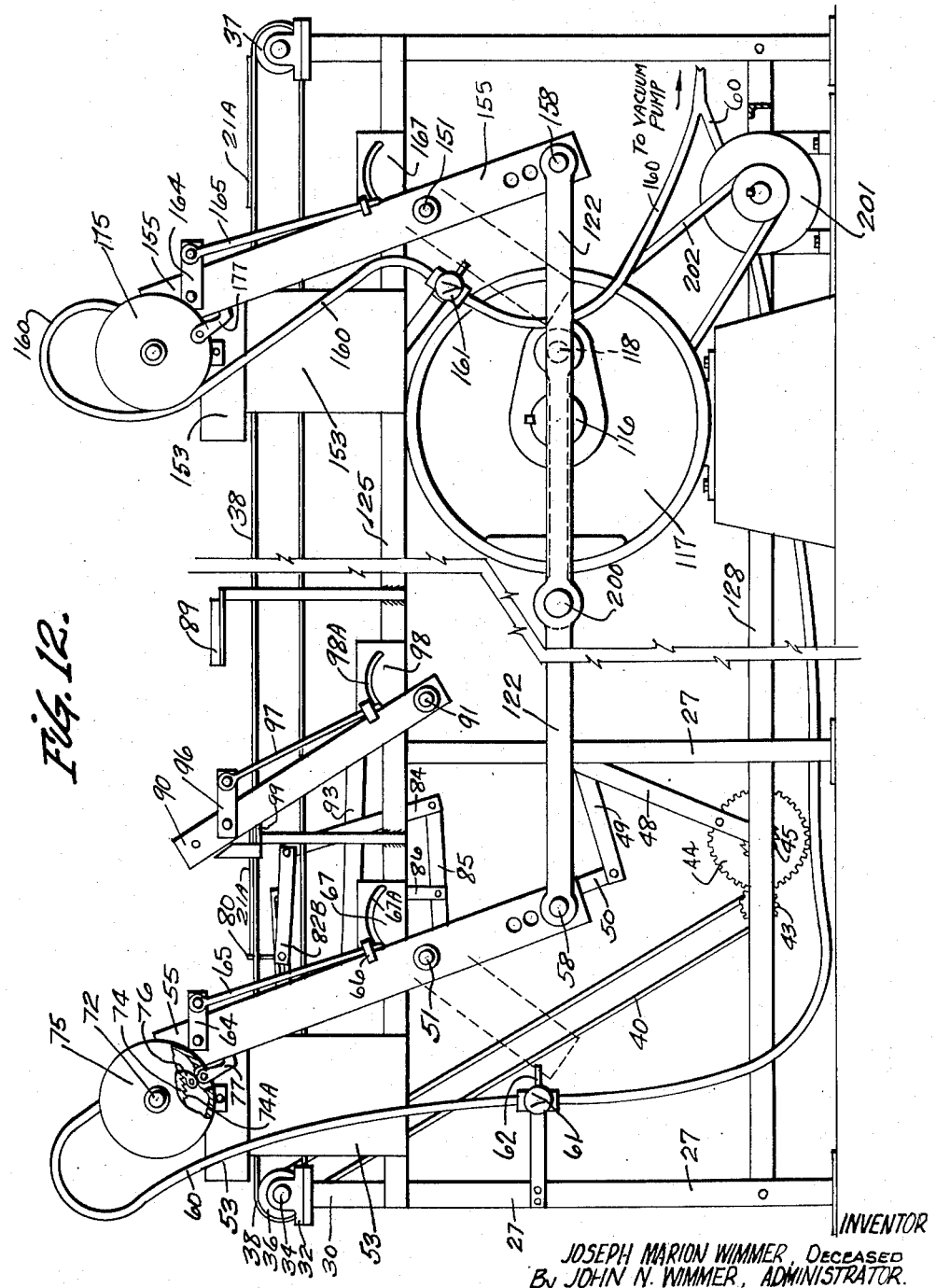

Referring now to the drawings in which the various parts are designated by numerals, 15 designates a portion of the frame of a typical printing press, 16 the crank shaft, 17 the fly wheel, 18 the crank pin, and 19 sheet delivery arms equipped with press controlled vacuum pickup cups 20 which pick up each sheet of paper 21 after it is printed and delivers it ordinarily onto a pile (not shown), and which are here used to deliver the sheets singly and successively to the assembling and pasting machine as lower sheets 21A on which upper sheets 21B are to be placed and adhesively attached. The machine movements are coordinated with the sheet delivery from the press by the connecting rod 22 connecting the crank pin 18 of the press to moving portions of the machine in manner hereinafter set out.

The machine may comprise an elongated rectangular frame which includes sides 25 and ends 26 supported by upright legs 27, the legs below the frame being suitably connected by side member 28 and end member 29, the frame for convenience in positioning for use, relatively to the press, preferably cantilevering beyond the leg supports.

Extending upward from the opposite ends of the frame side 25 are posts 30, 31 which respectively support bearings 32 and bearings 33. A transverse tail shaft 34 is journalled in the bearings 32, a transverse head shaft 35 in the bearings 33. The shafts 34 and 35 respectively carry and drive a tail drum 36 and head drum 37. The drums 36 and 37 extend from side to side of the frame and carry a belt or plurality of endless transfer belts 38 adapted to receive, transfer and position the lower sheets 21A, successively delivered thereon by the sheet delivery arms 19 of the press, and to subsequently discharge the finished sheet assembly 21C.

The tail shaft 34 carries a tail sprocket 39 (Fig. 2) which is driven through a chain belt 40 by a pinion sprocket 41. The sprocket 41 is mounted on a shaft 42 preferably journalled by one of the side members 28, the shaft carrying and being driven by a pinion 43, which in turn meshes with and is driven by a gear 44. The gear 44 and a ratchet wheel 45 (Figs. 3, 9, and 10) are secured on a gear shaft 46 journalled by the side bar 28. Engaging the ratchet wheel is a pawl 47 which is carried by a pawl carrier 48 mounted on, and oscillatable about the gear shaft 46. The carrier 48 is connected by a link 49 to a lever 50 secured as by keying at its upper end on a cross shaft 51 oscillatably journalled in bearings 52 depending from the frame sides 25.

Mounted on the frame sides 25, is a stand 53, which extends above the level of the belts 38, on which stand a stack 21C of upper sheets 21B are placed prior to initiating operation of the machine and positioned as against stops 54.

The means for transferring the sheets 21B successively from the stand 53 and effecting subsequent operations includes transfer arms 55 and 56 which are secured as by keying to the shaft 51, and extend therefrom above the level of the stand, and above such level carry a transverse tubular bar 57. One of these arms as the arm 55 also extends below the shaft and is coupled by a pivot pin 58 to the connecting rod 22, for shift in conformity with movements of the printing press, of the tubular bar 57 from a sheet pickup position over the stand 53 to sheet release position over the belts 38 and return.

The bar 57 carries depending vacuum cups 59 which are connected through the bar and a flexible hose line 60 to a vacuum pump (not shown). Interposed in the hose line is a vacuum release valve 61 having a release member 62 adapted to open the valve and break the vacuum. The valve may be supported from one of the legs 27 of the machine with the release member 62 in the path of the lower end of the arm 55, as the arms 55 and 56 under shift, move the bar 57 and vacuum cups 58 carried by the upper ends of the arms, into release position over the belts. The bar 57 may have trunnion ends 63 which turn in the arms 55 and 56. One of these trunnions extends through one of the transfer arms as the arm 55 and has secured thereon a control member 64 to which a shift rod 65 is pivotally connected. The rod extends downward along the transfer arm and slidably through a rod guide 66 into overlying relation to a cam plate 67 having an arcuate cam groove 67A. At its lower end the rod may have an inwardly extending pin or pin portion, 65A which slidably engages in the groove 67A, and is adapted through the control member 64 to hold the vacuum cups level, and as the arm 55 swings from sheet pickup position (Fig. 1) to sheet release position 55A (indicated by dash lines) is adapted to be moved by the cam groove relatively to the arm 55 to maintain the level positioning of the cups, and hold them parallel to the sheets of paper being picked up and transferred by the cups from the stand, and to place each sheet as an upper sheet 21B, on the adhesived lower sheet 21A which has been shifted by the belts 38 into position to receive the upper sheet.

The stand 53 includes a false bottom or tray 70 which may be suspended by straps 71 from an overlying shaft 72 suitably supported and journalled in uprights 73 extending from and above the stand. Secured on an end of the shaft is a ratchet wheel 74 which is shielded by a housing 75. The wheel has teeth 74A which are successively engaged by a pawl 76 which in turn is pivotally connected to a pawl carrier 77. The pawl carrier is pivotally supported by the housing in the path of return movement as one of the transfer arms, as the arm 55, for engagement and displacement by the transfer arm and shift of the pawl carrier and pawl, and advancement of the ratchet wheel 74 ordinarily in the amount of one tooth, incrementally winding up the straps and raising the false bottom 70 and sheets thereon as the upper sheets are removed.

Movement of the lower sheets 21A by the belts is limited and their accurate positioning controlled by stop pins 80 which are secured to and project upward from a transverse bar 81 which is raised to project the pins into the path of the lower sheet 21A and lowered to permit the subsequent progress to discharge of the completed sheet assembly 21C, (Figs. 3, 7 and 8). The bar 81 is preferably carried by longitudinally and angularly adjustable arms 82 each comprising a longitudinally slotted portion 82A which is hingedly supported as by a frame carried post 83, and a complementary portion 82B, the two parts being clamped together into a substantially rigid arm, preferably by a threaded extension 81A of the bar 81 and a nut 81B. Adjustment of the position of the pins 80 is accomplished by shift of the bar 81 along the slotted arm portions 82A. The free end of one of the adjusted arms 82 is connected through a link 84 with one end of an underlying rocker arm 85, pivotally supported by a frame carried hanger 86. On its opposite end the rocker arm carries a cam follower 87 which is in engagement with a cam 88. The cam is secured to and oscillated by the shaft 51, as the shaft is oscillated by shift movement of the arms 55, 56. The cam includes a restricted follower-receiving depression between and flanked by follower-engaging lobe portions 88A, 88B adapted respectively to engage and depress the follower 87 as the transfer arms 55, 56 approach and move away from the sheet pickup and sheet placing positions.

Disposed above the belt is a pan 89 for glue or other adhesive. Spaced between the pan the transfer arms are dipper arms 90 which for concurrent movement are secured to a transverse shaft 91 oscillatably mounted in bearings 92 carried by the frame. The dipper arms are connected by a link 93 with the transfer arms and their shift controlled thereby. The dipper arms carry adjacent their upper ends a transverse dipper bar 94 carrying a number of loosely fitting dipper pins 95, which on the backward movement of the arms 55, 56 are swung over and dip into glue or other adhesive 96 in the pan 89 and on the forward movement of the arms transfer the adhesive in a series of dots to the lower sheet 21A previously moved into place by the belts.

Preferably the dipper pins 95 are maintained in upright position as are the vacuum cups 59. The dipper bar 94 includes end portions 94A, 94B which are journalled in the arms 90, one of the end portions, as the portion 94B, having an arm 96 secured thereto. Extending downward from the arm is a control rod 97 having an inwardly extending portion 97A engaging a complementary slot 98A in a cam plate 98. A support plate 99 may be placed under the belt in underlying adjacency to the assembly position of the sheet 21A.

The machine as hereinbefore described may be used in connection with a coordinated sheet placing mechanism in lieu of the press mechanism hereinbefore shown for placing of the sheets.

Fig. 12 shows a machine in which the lower sheets are placed on the belts, by mechanism substantially identical with those heretofore described for placing the upper sheets and driving means other than the press is used. In this figure all parts of the original machine are designated by the numerals heretofore used and their description and operation is not repeated.

The lower sheets 121A are placed on a stand 153 and are transferred from the stand to the belts by transfer arms 155 equipped with vacuum cups and bar (not shown) of substantial identities with the cups 57 and bar 58, and are similarly controlled by the control member 164, and rod 165 and cam plate 167, and are equipped with vacuum line 160 and valve 161 actuated by movements of the arm 155.

The arms 55, 56 are oscillated by a connecting rod 122 coupled to a crank pin 118, which is turned by a crank shaft 116 as heretofore, and the arms 155, by a connecting rod 122 which to avoid excessive angularity is preferably connected by a pin 200 to the rod 122 intermediate its length. The shaft 116 may be driven by a motor 201 through a belt 202 and suitable pulleys.

In the operation with the tray 70 lowered, a stack of upper sheets 21B is placed on the tray and adhesive placed in the pan 87.

The printing press is then started and through the delivery arms 19 and cups 29 a sheet of paper 21 is delivered on the head end of the belts 38 as a lower sheet 21A. As this delivery is completed, the crank pin 18 of the press passes forward dead center, relatively to the machine, and begins retraction of the connecting rod 22 rearward by swinging the lower end of the transfer arm 55 and forwardly shifting the upper ends of both the arms 55 and 56 and correspondingly oscillating the cross shaft 51.

The upper ends of the transfer arms 55, 56 and the dipper arms 90 coupled thereto, swing forwardly bringing the vacuum cups 59 into pickup engagement with the upper sheets 21B to be next placed and the dipper pins 95 into adhesive depositing engagement with the transferred lower sheet 21A as rearward dead center of the crank pin 18 is reached and the forward movement of the belt ends.

These arm movements shift the shaft 51 and the lever 50, and through the linkage 49, pawl carrier 42, and engagement of the pawl 47 with the ratchet wheel 45, turns the gear 44. The gear 44 meshing with the pinion 43, rotates the sprocket 41 and through the chain belt 40 and the tail sprocket 39 advances the transfer belts 38 in the amount to shift the sheet 21A against the stop pins 80 and into position to receive the adhesive and subsequently the upper sheet 21B.

As the forward movement and sheet advance approach completion, turning of the shaft 51 and cam 88 moves the lobe 88A of the cam against the cam follower 87 and, through the arm 85, line 84 and the adjustable arm 82, raises the stop pins 80 into stop position to limit movement of the sheet 21A by the belt as the sheet reaches its desired stop position.

As the crank pin 18 passes rear dead center, and the connecting rod 22 is moved forward the lower end of the transfer arm 55 is swung forward, and through the shaft 51 the lever 50 is correspondingly moved but with the ratchet pawl 47 overriding the ratchet wheel 55 and effecting no belt shift.

The upper ends of the transfer arms 55, 56 swing rearwardly with the vacuum cups 59 transferring an upper sheet 21B from the stack to completing position on the previously placed lower sheet 21A and forcing the upper sheet into adhesived engagement with the lower sheet. The dipper arms 90 shift correspondingly shifting the dipper bar 94 over the adhesive pan 89 and dipping the pins 95 in the adhesive 96.

During the shift, turning movement of the shaft 51 moves the cam lobe 88A from engagement with the cam follower and the stop pins 80 are dropped releasing the sheets 21A, 21B for later shift.

It will be understood that various changes and modifications may be made in the machine as shown in the drawings and described in the specification and that they are submitted as illustrative and not in a limiting sense, the scope of the invention being defined in the claims.

It is claimed:

1. A sheet assembling and attaching machine adapted for association with a source of sheets having a crank arm, a crank pin, driving means and coordinated means for delivering during a first half cycle of said crank pin sheets from said source to said machine; said machine including carrier means for receiving a delivered said sheet, means including over-running return means, coupled to said crank pin for advancing said carrier means during the second half cycle of said pin, positioning said delivered sheet in an assembling position and concurrently advancing from said position to discharge, a previously formed sheet assembly, means coordinated with said advancing means for placing adhesive on said positioned sheet; means for supporting a stack of upper sheets, means coordinated with carrier actuating movement of said carrier advancing means for engaging the upper sheet on said stack and an over-running return movement of said advancing means for removing said sheet from said stack and placing and adhesively attaching said sheet in overlying relation to said positioned and adhesived sheet.

2. A sheet assembling and attaching machine adapted for association with a printing press having a crank arm and crank pin and coordinated means for delivering during each outward half cycle of said pin, a sheet, from said press to said machine; said machine including a frame, and frame support, sheet shifting means including a head and a tail shaft journalled above and respectively at the inner feed, and outer discharge, ends of said frame, head and tail pulleys respectively secured on said shafts, an endless belt carried by said pulleys, a sprocket wheel secured on one of said shafts, an underlying sprocket shaft journalled by said frame, a sprocket wheel and a pinion secured on said sprocket shaft and an endless chain effecting driving connection between said sprocket wheels; a gear shaft journalled by said frame in adjacency to said sprocket shaft, a gear meshing with said pinion and a ratchet wheel secured on said gear shaft, said ratchet wheel having pawl engaging teeth facing away from said press, a pawl arm mounted on and oscillatable about said gear shaft, a ratchet pawl carried by said arm and during the inward half cycle of said crank pin engaging said ratchet for advancement of said belt and shift to delivery assembled sheets thereon, and to an assembly position a sheet placed by said press during the preceeding outward half cycle of said press; a transfer-arm rocker shaft underlying and oscillatably carried by said frame, a pair of transfer arms secured to said shaft and extending above the upper flight of said belt, one of said arms extending below said shaft, a connecting rod coupling said downwardly extending arm to said crank pin, and adapted to shift the upper ends of said arms forwardly to a sheet pickup position and rearwardly to said sheet assembly position, said rocker shaft being positioned to effect register of a delivered sheet with a sheet in said assembly position; a stand carried by said frame and including a sheet supporting portion above said belt in underlying relation to the upper ends of said transfer arms in forward position of shift, sheet pickup means carried by the upper ends of said arms and depending into pickup engagement with a sheet on said sheet supporting portion, in said forward position of shift, a downwardly extending lever secured on said rocker shaft and oscillatable thereby, and a link connecting said pawl arm and said lever; an adhesive supply pan supported by said frame rearwardly of said assembly position, a second rocker shaft underlying and oscillatably carried by said frame, adhesive-carrier arms secured to said second rocker shaft and extending therefrom above said belt, and a plurality of adhesive-carrying pins carried by the upper ends of said arms, linkage connecting said transfer arms and said adhesive-carrier arms for concurrent movement, said second rocker shaft being positioned rearwardly with relation to said assembly position to swing said adhesive-carrying pins forwardly into adhesive depositing position on a sheet shifted by said belt into assembly position, and said adhesive supply pan being positioned rearwardly of said second rocker shaft for engagement with adhesive in said pan by said pins on rearward swing of said arms.

3. Means for stopping and alining sheets deposited by said press on and transferred by said belt to assembly position in accordance with claim 2 which means includes stop pin-carrier arms hingedly supported by said frame, a transverse bar carried by and adjustable along said arms, stop pins projecting upward from said bar, a cam carried by and oscillatable with said transfer arms rocker shaft, an oscillatable arm pivotally supported intermediate its length by said frame, a cam follower on one end of said arm underlying said cam and a link connecting the opposite end of said oscillatable arm to the outer end of one of said pin carrier arms, said cam including a lobe portion adapted to downwardly displace said follower and project said pins above said belt, and being secured on said shaft to engage said lobe with said follower as said transfer arms swing forwardly into sheet pickup position.

4. Means for stopping and alining sheets deposited by said press on and transferred by said belt to assembly position in accordance with claim 2 which means includes stop pin-carrier arms hingedly supported by said frame, a transverse bar carried by said arms, stop pins projecting upward from said bar, a cam carried by and oscillatable with said transfer arms rocker shaft, an oscillatable arm pivotally supported intermediate its length by said frame, a cam follower on one end of said arm underlying said cam and a link connecting the opposite end of said oscillatable arm to the outer end of one of said pin carrier arms, said cam including a lobe portion adapted to downwardly displace said follower and project said pins above said belt, and being secured on said shaft to engage said lobe with said follower as said transfer arms swing forwardly into sheet pickup position.

5. A sheet assembling and attaching machine, adapted for association with sheet delivery means adapted to deliver single sheets successively to said machine; said machine including endless belt means for receiving said delivered sheets, belt advancing means including a ratchet wheel operatively coupled to said belt means, and a cooperative ratchet pawl, reciprocatable linkage operatively coupling said pawl to said sheet delivery means to override said ratchet wheel during delivery of a sheet on said belt and to engage said wheel subsequent to delivery of said sheet, and advance said belt means and position said sheet thereon in an assembly position, said belt means concurrently advancing a previously formed sheet assembly from said assembly position to discharge; means operatively coupled to said belt advancing means for placing adhesive on said positioned sheet as said advancement ends; means for supporting a stack of upper sheets, means coupled to said sheet advancing means timed for engaging the upper sheet on said stack as said advancing pawl movement ends and, during overrunning retraction movement of said pawl, for removing said sheet from said stack and for placing, adhesively attaching and releasing said sheet in overlying relation to said positioned and adhesived sheet.

6. A sheet assembling and attaching machine, adapted for association with means for delivering sheets successively to said machine; said machine including a frame, belt pulleys carried and journalled by said frame, an endless belt carried by said pulleys and adapted to receiving said delivered sheets, belt advancing means including a ratchet wheel operatively coupled to one of said pulleys, and a cooperative ratchet pawl, reciprocatable linkage operatively coupling said pawl to said sheet delivery means to override said ratchet wheel during delivery of a sheet on said belt and to engage said wheel subsequent to delivery of said sheet, and advance said belt means and position said sheet thereon in an assembly position, said belt means concurrently advancing a previously formed sheet assembly from said assembly position to discharge; means operatively coupled to said belt advancing means for placing adhesive on said positioned sheet as said advancement ends; means for supporting a stack of upper sheets, means coupled to said sheet advancing means timed for engaging the upper sheet on said stack as said advancing pawl movement ends and, during overrunning retraction movement of said pawl, for removing said sheet from said stack and for placing, adhesively attaching and releasing said sheet in overlying relation to said positioned and adhesived sheet.

7. A sheet assembling and attaching machine adapted for association with coordinated means for successively delivering sheets of paper one by one as lower sheets to said machine; said machine including a frame, and frame support, sheet shifting means including a head and a tail shaft journalled above and respectively at the inner, feed, and outer, discharge, ends of said frame, head and tail pulleys respectively secured on said shaft, an endless belt carried by said pulleys, a sprocket wheel secured on one of said shafts, an underlying sprocket shaft journalled by said frame, a sprocket wheel and a pinion secured on said sprocket shaft and an endless chain effecting driving connection between said sprocket wheels; a gear shaft journalled by said frame in adjacency to said sprocket shaft, a gear meshing with said pinion and a ratchet wheel secured on said gear shaft, said ratchet wheel having pawl engaging teeth facing away from said coordinated sheet delivery means, a pawl arm mounted on and oscillatable about said gear shaft, a ratchet pawl carried by said arm and adapted between deliveries of said lower sheets to engage said ratchet for advancement of said belt and shift to of assembled sheets thereon, and to an assembly position a lower sheet placed by said sheet delivery means on said belt, an upper sheet transfer-arm rocker shaft underlying and oscillatably carried by said frame, a pair of transfer arms secured to said shaft and extending above the upper flight of said belt, one of said arms extending below said shaft, means operatively connecting said downwardly extending arm to said sheet delivery means, and adapted to shift the upper ends of said arms forwardly to an upper sheet pickup position and rearwardly to said sheet assembly position, said rocker shaft being positioned to effect register of said upper sheet with a said lower sheet in said assembly position; a stand carried by said frame and including an upper sheet supporting portion above said belt in underlying relation to the upper ends of said transfer arms in forward position of shift, sheet pickup means carried by the upper ends of said arms and depending into pickup engagement with a sheet on said upper sheet supporting portion, in said forward position of shift, a downwardly extending lever secured on said rocker shaft and oscillatable thereby, and a link connecting said pawl arm and said lever; an adhesive supply pan supported by said frame rearwardly of said assembly position, a second rocker shaft underlying and oscillatably carried by said frame, adhesive-carrier arms secured to said second rocker shaft and extending upward therefrom above said belt, and a plurality of adhesive-carrying pins carried by the upper ends of said arms, linkage connecting said transfer arms and said adhesive-carrier arms for concurrent movement, said second rocker shaft being positioned rearwardly with relation to said assembly position to swing said adhesive-carrying pins forwardly into adhesive depositing position on said lower sheet shifted by said belt into assembly position, and said adhesive supply pan being positioned rearwardly of said second rocker shaft for engagement with adhesive in said pan by said pins on rearward swing of said arms.

8. A sheet assembling and attaching machine, adapted for association with sheet delivery means adapted to deliver single sheets successively to said machine; said machine including endless belt means for receiving said delivered sheets, belt advancing means including a ratchet wheel operatively coupled to said belt means, and a cooperative ratchet pawl, reciprocatable linkage operatively coupling said pawl to said sheet delivery means to override said ratchet wheel during delivery of a sheet on said belt and to engage said wheel subsequent to delivery of said sheet, and advance said belt means and position said sheet thereon is an assembly position, said belt means concurrently advancing a previously formed sheet assembly from said assembly position to discharge; vertically shiftable stop pins carried by said machine in underlying relation to said belt means, means operatively coupled to and actuated by said reciprocatable linkage for projecting said pins above said belt into the path of an approaching sheet and for subsequently retracting said pins; means operatively coupled to said belt advancing means for placing adhesive on said positioned sheet as said advancement ends; means for supporting a stack of upper sheets, means coupled to said sheet advancing means timed for engaging the upper sheet on said stack as said advancing pawl movement ends and, during overrunning retraction movement of said pawl, for removing said sheet from said stack and for placing, adhesively attaching and releasing said sheet in overlying relation to said positioned and adhesived sheet.

9. A sheet assembling and attaching machine, including a frame, belt pulleys journalled by said frame and endless belt means, carried by said pulleys, a motor driven crank shaft, crank cam, and crank pin, and frame carried parts including a ratchet wheel, gear and belt means operatively connecting said wheel to one of said pulleys, a ratchet pawl, engaging said ratchet wheel, linkage operatively coupling said pawl to said crank pin, to alternately override said ratchet wheel without belt advance, and engage said ratchet wheel, and advance said belt means and an under sheet thereon to an assembly position, said belt means concurrently advancing a previously formed sheet assembly from said assembly position to discharge; means for respectively supporting a supply of lower sheets, and a supply of upper sheets, arms in spaced pairs coupled to said linkage for concurrent movement, means carried by one pair of said arms for removing said lower sheets singly from said supply of lower sheets and transferring said removed sheet to deposit on said belt means, for subsequent shift by said belt, and means carried by the other pair of said arms for removing said upper sheets singly from said supply of upper sheets and transferring said removed sheet to deposit on and adhesive securement to a belt transferred said lower sheet, said upper sheets removal means being positioned with relation to said sheet assembly position to effect register of a lower sheet at said position, means coupling said arms to said belt advancing linkage to shift said arms to pickup position during belt advance and shift from pickup position to deposit position during belt stoppage, adhesive applying means including an adhesive supply, carrier arms, disposed between said upper and lower sheet transfer means, and in position to be shifted into pickup register with said adhesive supply and subsequently into deposit register with said assembly position, and linkage coupling said carrier arms to said upper sheet transfer arms for movement to adhesive deposit concurrently with pickup of said upper sheet and movement to adhesive pickup during deposit of said upper sheet.

10. A sheet assembling and attaching machine adapted for association with sheet delivery means adapted to deliver single sheets successively to said machine; said machine including endless belt means for receiving said delivered sheets, belt advancing means operatively coupled to said belt means and to said sheet delivery means to advance said belt means and position said sheet thereon in an assembly position, said belt means concurrently advancing a previously formed sheet assembly from said assembly position to discharge; means operatively coupled to said belt advancing means for placing adhesive on said positioned sheet as said advancement ends; means for supporting a stack of upper sheets, means coupled to said sheet advancing means timed for engaging the upper sheet on said stack as said advancing movement ends and removing said sheet from said stack and for placing, adhesively attaching and releasing said sheet in overlying relation to said positioned and adhesived sheet.

11. A sheet assembling and attaching machine adapted for association with sheet delivery means adapted to deliver single sheets successively to said machine; said machine including endless belt means for receiving said delivered sheets, belt advancing means including a ratchet wheel operatively coupled to said belt means, and a cooperative ratchet pawl, reciprocatable linkage operatively coupling said pawl to said sheet delivery means to override said ratchet wheel during delivery of a sheet on said belt and to engage said wheel subsequent to delivery of said sheet, and advance said belt means and position said sheet thereon in an assembly position, means operatively coupled to said belt advancing means for placing adhesive on said positioned sheet as said advancement ends; and means for placing, adhesively attaching and releasing another sheet in overlying relation to said positioned sheet.

12. A sheet assembling and attaching machine adapted for association with sheet delivery means adapted to deliver single sheets successively to said machine; said machine including endless belt means for receiving said delivered sheets, belt advancing means coupled to said belt means, and to said sheet delivery means to advance said belt means and position said sheet thereon in an assembly position, said belt means concurrently advancing a previously formed sheet assembly from said assembly to discharge; means operatively coupled to said belt advancing means for placing adhesive on said positioned sheet as said advancement ends; means for supporting a stack of upper sheets, means coupled to said sheet advancing means timed for engaging the upper sheet on said stack as said advancing movement ends and for removing a sheet from said stack and placing, adhesively attaching and releasing said sheet from said stack in overlying relation to said positioned and adhesived sheet.

13. A sheet assembling and attaching machine adapted for association with sheet delivery means adapted to deliver single sheets successively to said machine; said machine including endless belt means for receiving said delivered sheets, belt advancing means including a ratchet wheel operatively coupled to said belt means, and a cooperative ratchet pawl, reciprocatable linkage operatively coupling said pawl to said sheet delivery means to override said ratchet wheel during delivery of a sheet on said belt and to engage said wheel subsequent to delivery of said sheet, and advance said belt means and position said sheet thereon in an assembly position, and means for placing, adhesively attaching and releasing another sheet in overlying relation to said positioned sheet.

JOHN N. WIMMER,
*Administrator of the estate of Joseph Marion Wimmer, deceased.*

References Cited in the file of this patent

UNITED STATES PATENTS

| Number | Name | Date |
|---|---|---|
| 1,780,916 | Harrison | Nov. 11, 1930 |
| 2,371,179 | Mendes | Mar. 13, 1945 |
| 2,579,094 | Rooksby | Dec. 18, 1951 |